US00RE44620E

(19) United States
(12) Reissued Patent
Hyun et al.

(10) Patent Number: US RE44,620 E
(45) Date of Reissued Patent: Dec. 3, 2013

(54) SIP-BASED USER MOBILITY PROVIDING APPARATUS AND METHOD

(71) Applicant: Pantech Co., Ltd., Seoul (KR)

(72) Inventors: Eun-Hee Hyun, Daejeon (KR); Young-Jick Bahg, Daejeon (KR)

(73) Assignee: Pantech Co., Ltd., Seoul (KR)

(21) Appl. No.: 13/649,539

(22) Filed: Oct. 11, 2012

Related U.S. Patent Documents

Reissue of:
(64) Patent No.: 7,292,561
Issued: Nov. 6, 2007
Appl. No.: 10/882,604
Filed: Jun. 30, 2004

U.S. Applications:
(63) Continuation of application No. 13/300,799, filed on Nov. 21, 2011, now Pat. No. Re. 43,789, which is a continuation of application No. 12/612,327, filed on Nov. 4, 2009, now Pat. No. Re. 42,996.

(30) Foreign Application Priority Data

Dec. 5, 2003 (KR) ..... 10-2003-0087886

(51) Int. Cl.
*H04W 4/00* (2009.01)

(52) U.S. Cl.
USPC ..... 370/338; 370/395.2

(58) Field of Classification Search
None
See application file for complete search history.

(56) References Cited

U.S. PATENT DOCUMENTS

| | | | |
|---|---|---|---|
| 7,395,336 | B1 | 7/2008 | Santharam et al. |
| 2003/0048195 | A1 | 3/2003 | Trossen |
| 2003/0154293 | A1 | 8/2003 | Zmolek |
| 2004/0218605 | A1 | 11/2004 | Gustafsson et al. |
| 2005/0021976 | A1 | 1/2005 | Trossen |

FOREIGN PATENT DOCUMENTS

| | | | |
|---|---|---|---|
| KR | 100179510 | | 11/1998 |
| KR | 100179510 | B1 | 11/1998 |
| KR | 1020030001672 | | 1/2003 |
| KR | 1020030001672 | A | 1/2003 |

OTHER PUBLICATIONS

Ubiquitous Computing Using SIP, 8 pages, considered during examination of U.S. Patent No. 7,292,561.
Non-Final Office Action dated Mar. 1, 2011 in U.S. Appl. No. 12/612,327.
Notice of Allowance dated Jul. 29, 2011 in U.S. Appl. No. 12/612,327.
Notice of Allowance dated Jun. 26, 2012 in U.S. Appl. No. 13/300,799.
Ubiquitous Computing Using SIP, 8 pages.
Ubiquitous Computing Using SIP, 8 pages, no date provided.

*Primary Examiner* — Erika A Washington
(74) *Attorney, Agent, or Firm* — H.C. Park & Associates, PLC

(57) ABSTRACT

Disclosed are an SIP-based user mobility service providing apparatus and method using user position information obtained by a sensing apparatus. When a user enters a specific region, a gateway including a sensing management module carries out SIP registration for several terminals existing in the specific region in place of user agents of the terminals. The sensing management module transmits an SIP registration message to an SIP proxy server and notifies the terminals of the completion of SIP registration. Then, the user receives a call using the same kind of a terminal as a specific terminal previously set on the basis of a user's preferences among the terminals in the specific region.

20 Claims, 4 Drawing Sheets

SIP-BASED USER MOBILITY PROVIDING APPARATUS AND METHOD

Matter enclosed in heavy brackets [ ] appears in the original patent but forms no part of this reissue specification; matter printed in italics indicates the additions made by reissue.

CROSS REFERENCE TO RELATED APPLICATION

[This application is based on Korea Patent Application No. 2003-87886 filed on Dec. 5, 2003 in the Korean Intellectual Property Office, the content of which is incorporated herein by reference.] *More than one reissue application has been filed for the reissue of U.S. Pat. No. 7,292,561. The reissue applications are application Ser. No. 12/612,327, filed on Nov. 4, 2009 and issued as U.S. Pat. No. Re. 42,996 (Parent reissue application), continuation reissue application having application Ser. No. 13/300,799, filed on Nov. 21, 2011 and issued as U.S. Pat. No. Re. 43,789, and the present continuation reissue application, filed on Oct. 11, 2012.*

*This continuation reissue application is a continuation reissue application of U.S. patent application Ser. No. 13/300,799, filed on Nov. 21, 2011 and issued as U.S. Pat. No. Re. 43,789, which is a continuation reissue application of U.S. patent application Ser. No. 12/612,327, filed on Nov. 4, 2009 and issued on Dec. 6, 2011 as U.S. Pat. No. Re. 42,996, which is a reissue of U.S. Pat. No. 7,292,561, filed on Jun. 30, 2004 as U.S. patent application Ser. No. 10/882,604 and issued on Nov. 6, 2007, and claims priority from and the benefit of Korean Patent Application No. 10-2003-0087886, filed on Dec. 5, 2003, all of which are hereby incorporated by reference for all purposes as if fully set forth herein.*

BACKGROUND OF THE INVENTION (a) Field of the Invention

The present invention relates to an SIP-based user mobility providing apparatus and method using user location information obtained by a sensing apparatus.

(b) Description of the Related Art

There are a variety of networks having different performances and applications for communication services. Users are provided with the communication services using various kinds of terminals. With the development of wired and wireless communication techniques, the users want to select communication infrastructures providing the communication services according to their preferences.

The development of wired and wireless communication networks and a user's desire for being provided with the communication services whenever and wherever the user wants, creates a service environment in which various communication networks coexist in an arbitrary place. In this service environment, the user can use various network services depending on a place where the user uses the services, a moving speed, the kind of information the user wants to use, a performance level, and costs. Furthermore, a user terminal used for communications can have various forms and a choice of a terminal may affect a choice of a communication network. The user has an inclination in utilization of communication services in the aforementioned service environment.

A session initiation protocol (SIP) is a call signaling protocol of an application layer, which provides multimedia session initiation, exchange of session information, and cancellation of session. The SIP allows a user to be provided with communication services using a uniform resource identifier (URI) irrespective of a physical position of a user or a user terminal. That is, a service based on a user's preferences can be provided by several service features in an SIP-based multimedia service environment. Furthermore, services that allow a user to select a communication terminal according to his/her taste are proposed. For example, a receiving terminal for the wired/wireless telephone, E-mail, facsimile, and SMS service can be chosen according to a condition designated by a user. For this, an SIP service network has a separate database that stores user's preferences using for initiation of a communication session.

However, the above-described service can be provided only when the user has a designated terminal or he/she is in a place where the terminal exists. That is, if an arbitrary user provides his/her preferences for services to the SIP service network, a call is accomplished only when the user is located beside a terminal that is designated such that it receives the call at the instant of time when someone attempts to make the call.

Accordingly, there has been proposed a ubiquitous service by which users can be provided with information or services they want in any place using various devices having a computing function that exist in any space. For the ubiquitous service, it is required to collect various contexts of users in order to conjecture psychological states and thoughts of the users and provide services they need.

To grasp the states of the users, various sensing apparatuses are required. There are various sensing apparatuses depending on kinds of information the apparatuses should collect.

Current selective services based on a user's preferences are provided depending on only preference information that has been designated by the user. Thus, the information can designate a terminal for receiving a call only when a designated condition, such as a condition that 'a call is received by a specific terminal at a specific time zone' or a condition that 'a call satisfying a specific condition is sent to voice mail', is satisfied. However, the call does not arrive at a corresponding user when the user is not located near the terminal.

Furthermore, terminals to be used for services using the SIP must be registered before a communication session is initiated. The SIP Registration cannot be spontaneously carried out when there is no user's intention. In particular, when many unspecified persons share one terminal, it is impossible to conjecture users and carry out the SIP registration. In the case of originating a call, the SIP registration is performed at the instant of time when a user signifies his/her intention to make a call using a terminal, such that he/she uses the terminal, clicks a button or a mouse, or uses a keyboard, and then a session is initiated. In the case of terminating a call, however, when the SIP registration has not been carried out by SIP user agent, any attempt to execute a communication is not received. Thus, a terminating part cannot carry out the SIP registration in time because the terminating part cannot be aware of the time when the terminating part is requested to receive a call. When the terminating part uses his/her own terminal, the SIP registration can be performed when the terminal is turned on or the terminating part previously sets the SIP registration. However, when many persons share one terminal or a user uses an arbitrary terminal in an arbitrary place, the user should carry out the registration using the several terminals. This considerably restricts the communication service using the SIP.

SUMMARY OF THE INVENTION

It is an object of the present invention to provide an SIP-based user mobility providing apparatus and method for supporting user mobility such that a user can receive a call in any place he/she exists using an arbitrary terminal existing in the place by using an SIP service network and a sensing apparatus in an environment where a variety of communication infrastructures coexist.

In one aspect of the present invention, an SIP-based user mobility service providing apparatus is connected to an SIP-based IP multimedia service network in an environment where various communication infrastructures coexist, and transmits an SIP message to an SIP terminal and an SIP proxy server through a gateway to provide a mobile user with an SIP service.

The SIP-based user mobility service providing apparatus comprises a sensing part that detects an event that the user enters a specific region or goes out of the specific region, to grasp a position of the user, and a sensing management module that receives information on the position of the user in the specific region from the sensing part and carries out SIP registration for several terminal existing in the specific region in place of the user, to allow the user to receive a call using a specific terminal among the plurality of terminals.

The specific terminal has the same capability as that of a terminal selected on the basis of a predetermined terminal priority order depending on a user's preferences among the several terminals existing in the specific region.

The sensing part includes a marker that transmits specific information in response to the user's position, and a receiver that receives the specific information from the marker to detect the event that the user enters the specific region or goes out of the specific region and transmits the detected information to the sensing management module. The sensing management module can be mounted in the gateway or constructed in a separate machine having computing capability.

The sensing management module comprises an interface unit for communicating with the receiver of the sensing unit, the SIP proxy server, the SIP terminal, and an operator terminal that manages the receiver of the sensing unit and controls the sensing management unit; an information managing unit that manages the user information and information on the terminals in the specific region; and an SIP service supporting unit that carries out SIP registration for the several terminals existing in the specific region and notification of the completion of SIP registration such that the user is provided with the SIP service.

The operator terminal determines a range of the specific region on the basis of a marker detection allowable limit of the receiver. In addition, the operator terminal determines a marker monitoring period to determine whether the user exists in the specific region.

The sensing management module further comprises a user authentication unit that determines whether the user in the specific region uses the several terminals existing in the specific region and whether the user subscribes to an SIP service provider. The sensing management module further comprises a management information database for storing SIP registration related information including the user information and the information on the terminals in the specific region.

The information managing unit comprises a user/marker mapping manager for managing mapping information of an ID of the marker and a URI of the user; a terminal information manager for managing the information on the terminals existing in the specific region; and an active user manager for managing information of the user activation in the specific region;

The SIP service supporting unit comprises an SIP user registration/cancellation proxy unit that generates an SIP registration message for each of the several terminals in the specific region according and transmits the SIP registration message to the SIP proxy server to perform SIP registration; and an SIP user registration/cancellation notifying unit that notifies the SIP terminal of the completion of SIP user registration when SIP registration has been completed through the SIP user registration/cancellation proxy unit.

The interface unit comprises a sensing receiver interface that provides an interface for transmitting information on the result of the detection of the event that the user enters the specific region or goes out of the region from the sensing part to the sensing management module; an SIP proxy server interface that provides an interface for transmitting the SIP registration message for each of the terminals to the SIP proxy server; an SIP terminal interface that provides an interface for transmitting the SIP registration completion notification to the SIP terminal; and an operator interface that provides an interface for operating and controlling the sensing management module by the operator terminal.

The present invention also provides an SIP-based user mobility service providing method using an SIP-based user mobility providing apparatus that is connected to an SIP-based IP multimedia service network in an environment where various communication infrastructures coexist, and transmits an SIP message to an SIP terminal and an SIP proxy server through a gateway to provide a mobile user with an SIP service.

The SIP-based user mobility service providing method comprises converting each terminals existing in a specific region to an available state when a user who is authorized to use the SIP service enters the specific region; and receiving a call using a specific terminal having the same capability as that of a terminal previously set on the basis of a user's preferences among the plurality of terminals in the available state.

The SIP-based user mobility service providing method further comprising performing user authentication for determining whether the user is authorized to use the terminals existing in the specific region and whether the user is authorized to use the SIP service when the user enters the specific region before the converting the terminals existing in the specific region to the available state when the user who is authorized to use the SIP service enters the specific region.

The converting the each terminals existing in the specific region to the available state when the user who is authorized to use the SIP service enters the specific region comprises detecting the event that the user enters the specific region; generating an SIP registration message for the each terminals in the specific region and transmitting the SIP registration message to the SIP proxy server to carry out SIP registration; and notifying the SIP terminal of the completion of SIP registration when SIP registration has been completed.

The converting the each terminals existing in the specific region to the available state when the user who is authorized to use the SIP service enters the specific region further comprises periodically confirming whether the user exists in the specific region after the notifying the SIP terminal of the completion of SIP registration when SIP registration has been completed.

The converting the each terminals existing in the specific region to the available state when the user who is authorized to use the SIP service enters the specific region further comprises, when it is confirmed that the user does not exist in the specific region, generating an SIP registration cancellation message for the plurality of terminals in the specific region and transmitting the SIP registration cancellation message to the SIP proxy server, to carry out cancellation of SIP registration; and notifying the SIP terminal of the completion of SIP registration cancellation when the cancellation of SIP registration has been completed.

BRIEF DESCRIPTION OF THE DRAWINGS

The accompanying drawings, which are incorporated in and constitute a part of the specification, illustrate an embodiment of the invention, and. together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
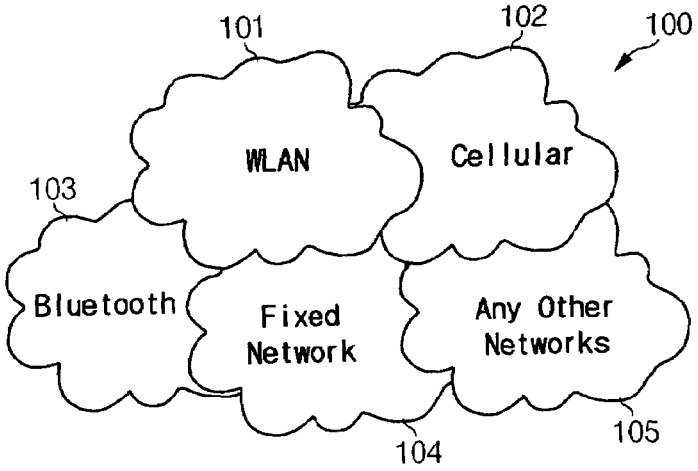
FIG. 1 illustrates a service environment where various communication networks coexist, to which the present invention is applied.

FIG. 1 illustrates a service environment where a variety of communication networks coexist, to which the present invention is applied.

As shown in FIG. 1, the service environment 100 includes a wireless LAN (WLAN) environment 101 having access points which are equipped in a campus or an office building, which is used for walking speed; a cellular or personal mobile communication environment 102 usable for a moving speed higher than a certain level, such as in a car; a Bluetooth environment 103 for communications through radio apparatuses or Internet access in the home or office; a conventional fixed network environment 104; and any other network environments 105.

The above-described communication infrastructures provide communication services while being overlapped in an arbitrary region, and they can be classified depending on a method of providing a physical communication path. Furthermore, the communication infrastructures can include networks of different telecommunication operators using the same communication method. Users select communication infrastructures or terminals used for communications on the basis of various and complicate factors including costs, environmental factors, personal tastes, and so on. For example, the users can select communication infrastructures or terminals on the basis of capability of currently usable terminals, a billing policy of a communication infrastructure, service quality, importance of a communication counterpart, an emergency degree, and so on. These factors are combined with information on a specific time zone or a place where the users exist, and are applied to the selection of the communication infrastructures or terminals.

A system and a method for providing user mobility in a ubiquitous environment will now be explained.

Figure 2:
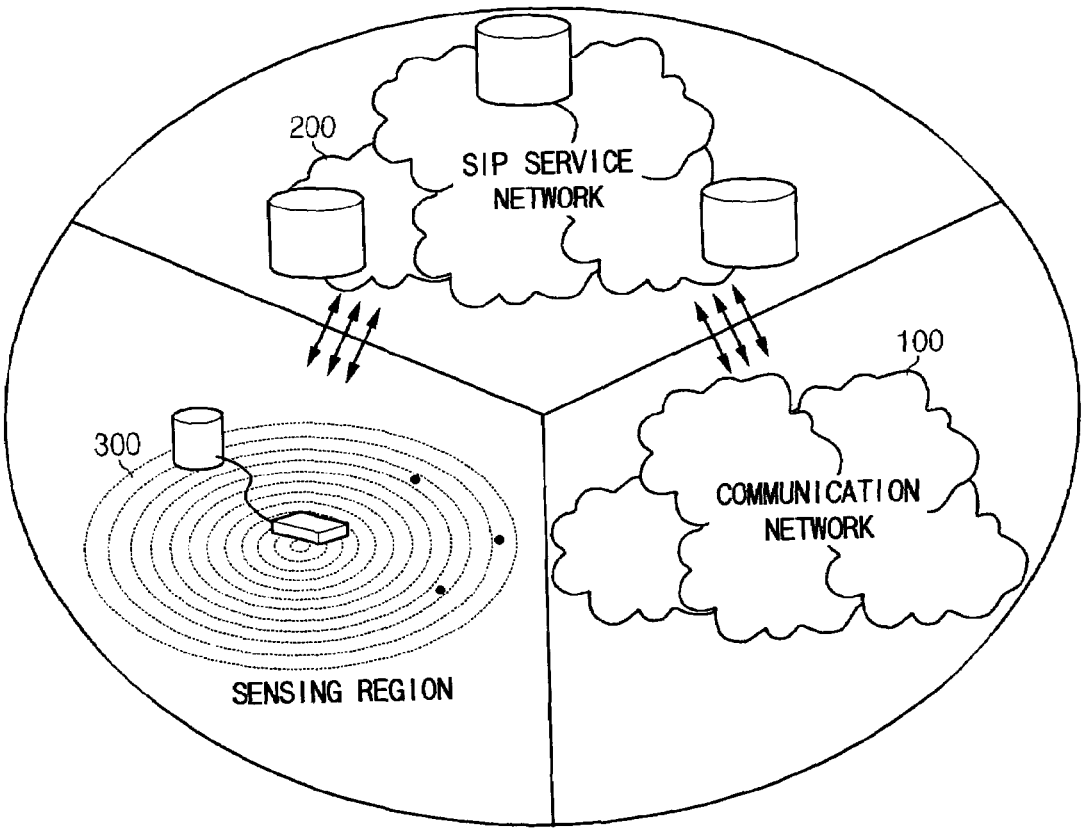
FIG. 2 illustrates a mobile multimedia service environment for supporting user mobility according to an embodiment of the present invention.

FIG. 2 illustrates a mobile multimedia service environment for supporting user mobility according to an embodiment of the present invention. FIG. 2 shows a mobile multimedia service environment supporting user mobility, to which a moving user's preferences can be applied, in an environment where various communication infrastructures coexist.

The mobile multimedia service environment for supporting user mobility includes an SIP service network 200 that provides a mobile multimedia service using an SIP on the basis of various communication infrastructures 100 having different transmission methods.

Figure 3:
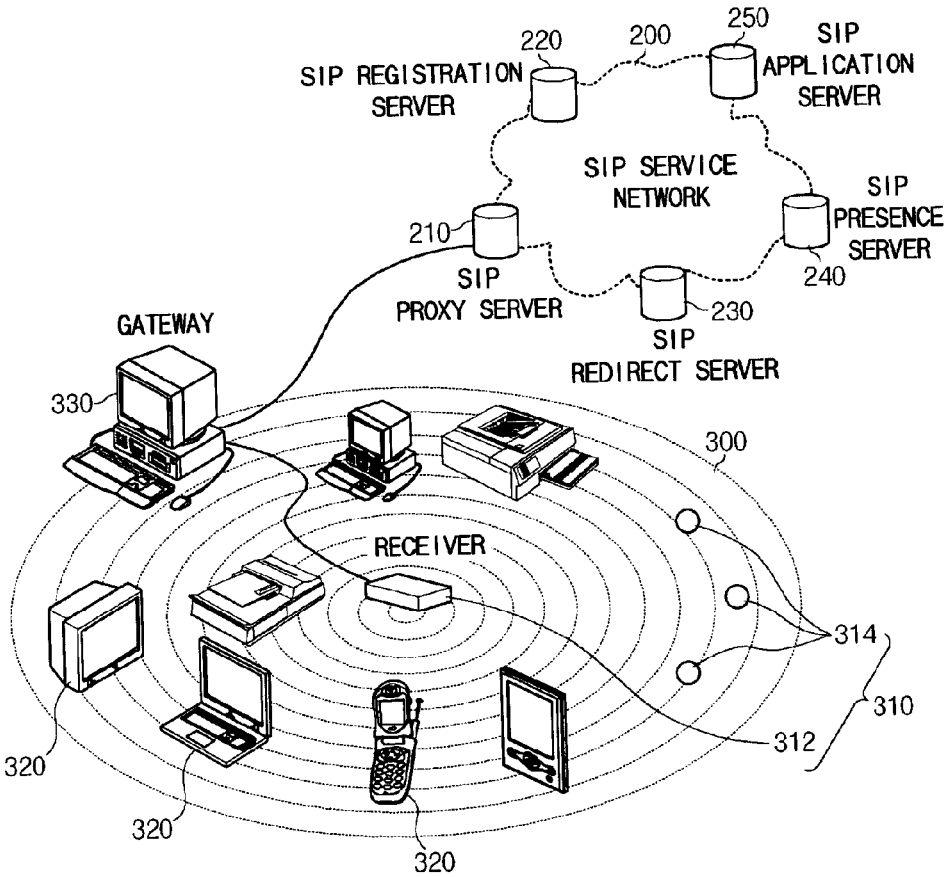
FIG. 3 illustrates an SIP-based mobile multimedia service network in connection with a sensing apparatus according to an embodiment of the present invention.

The environment having the various communication infrastructures includes a service environment having a sensing region 300 where a user who has been moved from a region where his/her terminal exists to the sensing region 300 can originate or terminate a call using a terminal existing in the sensing region. In the sensing region 300, communication services are provided to the user through a terminal resource existing in the area where the user is located on the basis of a user's preferences previously registered without having the user's intentional intervention in cooperation with the SIP service network 200 that is a service control network. FIG. 3 illustrates the SIP service network (SIP-based mobile multimedia service network) in connection with a sensing apparatus in the sensing region according to an embodiment of the present invention.

According to the present invention, the sensing apparatus 310 is installed in the sensing region 300 in order for the SIP service network 200 to support user mobility. The sensing apparatus 310 manages the sensing region 300 and includes a receiver 312 and markers 314. Various kinds of sensing apparatuses can be utilized depending on a sensing method and physical structural characteristics of an environment where the sensing apparatus is installed.

The sensing region 300 is a space where an arbitrary user selects one of terminals 320 existing therein to use the selected terminal for communications. The sensing region 300 is formed by installing the sensing apparatus and defining a sensing diameter.

Furthermore, the sensing region 300 means an area where the receiver 312 can recognize signals of the markers 314. The range of the sensing region 300 can be varied according to a selected sensing apparatus. The sensing region 300 can be intentionally formed to be small or large in order to define a personal space within the capability of the sensing apparatus 310.

Each of the markers 314 transmits unique information such as an ID to the receiver 312 such that the receiver 312 knows the existence of the marker 314. The marker 314 has a small size and low power consumption such that a user uses it conveniently. The user should carry the marker 314. The receiver 312 receives the ID of the marker 314 using a predetermined method to detect a movement of the user carrying the marker 314.

The SIP service network 200 includes an SIP proxy server 210, an SIP registration server 220, an SIP redirect server 230, an SIP presence server 240, and an SIP application server 250. The SIP service network 200 uses functions of a conventional SIP service network so that detailed explanation thereof is omitted.

To transmit information on the movement of the user who carries the marker 314 to the SIP service network 200, which is obtained from the identification of the marker 314 by the receiver 312, a sensing management module having sensing management and transmission functions of storing or processing the user movement information is required.

Figure 4:
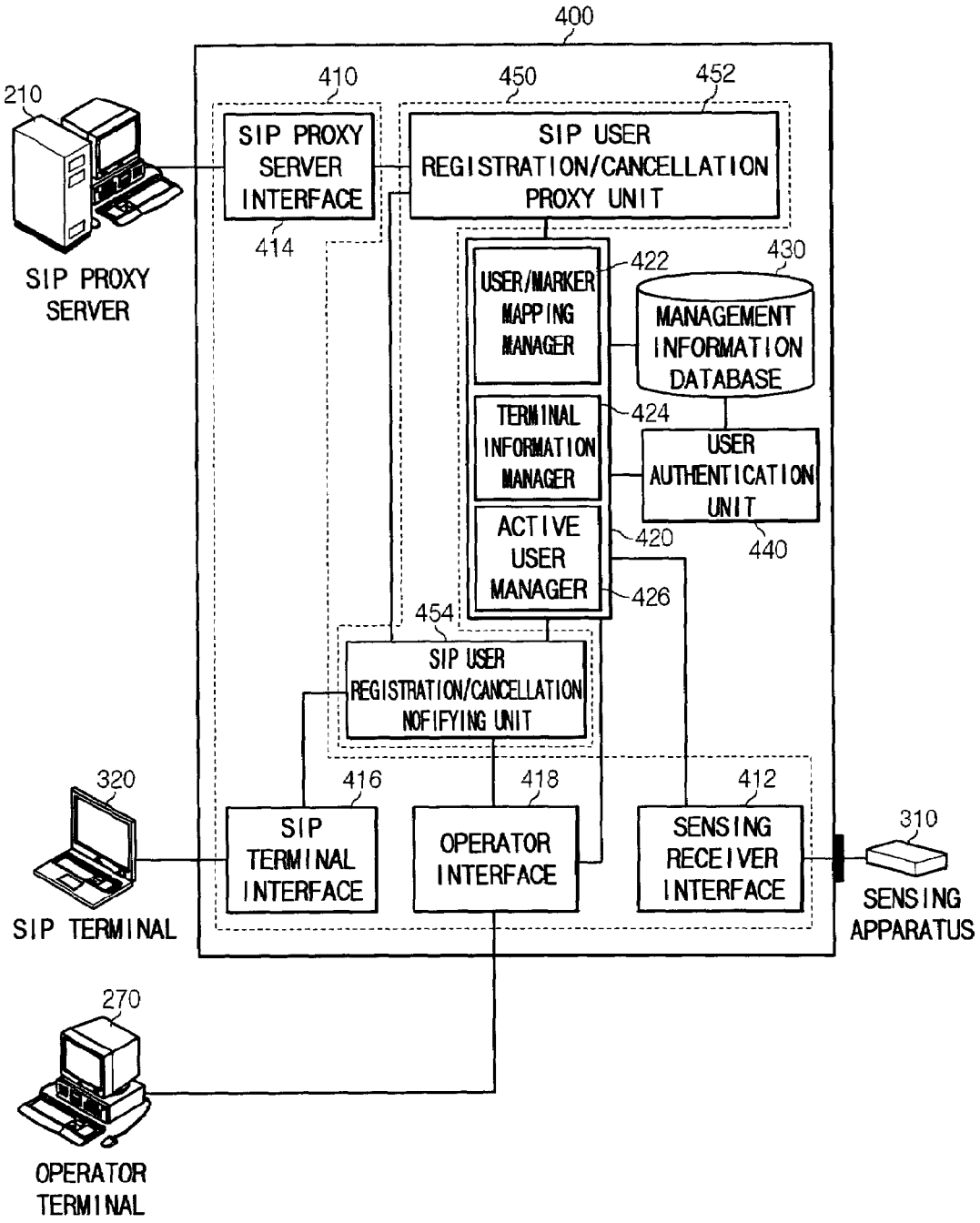
FIG. 4 is a block diagram of a sensor management module of an SIP-based user mobility providing apparatus according to an embodiment of the present invention.

FIG. 4 is a block diagram of the sensing management module of the SIP-based user mobility providing apparatus according to an embodiment of the present invention. Here, the sensing management module is mounted in a gateway 330 (shown in FIG. 3).

Referring to FIG. 4, the sensing management module 400 includes an interface unit 410, an information management unit 420, a management information database 430, a user authentication unit 440, and an SIP service supporting unit 450. The interface unit 410 includes a sensing receiver interface 412, an SIP proxy server interface 414, an SIP terminal interface 416, and an operator interface 418.

The sensing receiver interface 412 receives the identifier of the marker 314 whose movement is recognized. In addition, the sensing receiver interface 412 depends on a hardware connection of the receiver 312 and the computer (gateway) 330 in order to obtain information on a user who enters a corresponding region.

The SIP proxy server interface 414 is connected with an SIP user registration/cancellation proxy unit 452 to transmit/receive an SIP message to/from the SIP proxy server 210. The SIP terminal interface 416 is connected with an SIP user registration/cancellation notifying unit 454 to enable communication between the SIP terminal 320 and the computer (gateway) 330 on the basis of a communication method of the SIP terminal 320 existing in the sensing region 300 and the gateway 330. The communication method is determined on the basis of a wired or wireless communication standard or mode. Accordingly, the SIP terminal interface 416 is operated on the basis of information required for the interface 416 to be connected with the SIP terminal 320. This information can be stored in the management information database 430 and managed by it.

The operator interface 418 interfaces an operator terminal 270, the information management unit 420, and the SIP service supporting unit 450 with one another to allow an operator to search or change parameters for a rule that the operator should observe when he/she controls environmental variables, adds or deletes information, and carries out real-time operation though the operator terminal 270.

The operator terminal 270 controls reference values for procedures processed by various data tables and the components of the sensing management module 400 while the sensing management module 400 is operated. Furthermore, the operator terminal 270 determines a range of the sensing region 300 where the sensing apparatus 310 is installed to provide the service. In addition, the operator terminal 270 determines a monitoring period of the marker 314 for confirming whether a user continuously exists in the corresponding sensing region 300.

The information management unit 420 includes a user/marker mapping manager 422, a terminal information manager 424, and an active user manager 407. The user/marker mapping manager 422 maps the ID of the marker 314 with a URI that means a specific user when the sensing apparatus 310 receives the Identifier of the marker 314. The user/marker mapping manager 422 is operated by a table that manages mapping of the marker ID and the user URI. The table is stored in the separate database 430 and managed by the database.

In the case that there are multiple sensing regions and users want to be provided with user mobility service while moving in these sensing regions, all information on mapping between the users and markers can be stored in sensing management modules corresponding to the respective sensing regions when the number of the users is small. When the number of the users is not small, a separate database can be used. Here, the sensor management module 400 can have a function of executing a separate communication with the separate database in order to obtain a URI of a user having a specific marker ID.

The terminal information manager 424 manages information on terminals existing in a specific region. Here, the information on the terminals includes information on characteristics of each terminal, which is required for the SIP service supporting unit 450 to carry out SIP registration in place of a user agent UA of the terminal, and information required for the user agent UA to perform SIP registration in the SIP service network 200. The information on the terminals is stored in the separate database 430.

The active user manager 426 manages active information on whether a user exists in the corresponding sensing region 300. In addition, the active user manager 426 manages information on active users through the database 430.

The user authentication unit 440 authenticates whether a user who has moved to the corresponding sensing region 300 is authorized to use the terminals 320 existing in the sensing region or to use the mobile multimedia service. Information required for the authentication is stored in the database 430 and managed by the database 430. The user authentication unit 440 can be operated by a separate authentication server such that multiple sensing regions can commonly access the user authentication unit 440.

The SIP service supporting unit 450 includes the SIP user registration/cancellation proxy unit 452 and the SIP user registration/cancellation notifying unit 454. The SIP user registration/cancellation proxy unit 452 carries out SIP registration for a corresponding user in place of user agents of the SIP terminals.

The SIP user registration/cancellation notifying unit 454 notifies the user agents of the SIP terminals that SIP user registration has been completed when the gateway finishes SIP registration. Here, information required for operating a service session for a corresponding SIP terminal is transmitted.

The sensing management module 400 constructed as above carries out SIP registration of a corresponding terminal in place of a user such that the user can be provided with the SIP service using the terminal in a specific region. By doing so, the sensing management module 400 can manage the terminals existing in the sensing region 300 in order to select a terminal used for a communication session on the basis of a predetermined user's preferences in a specific region, and to control the terminals to be available when the user enters the sensing region 300.

Figure 5:
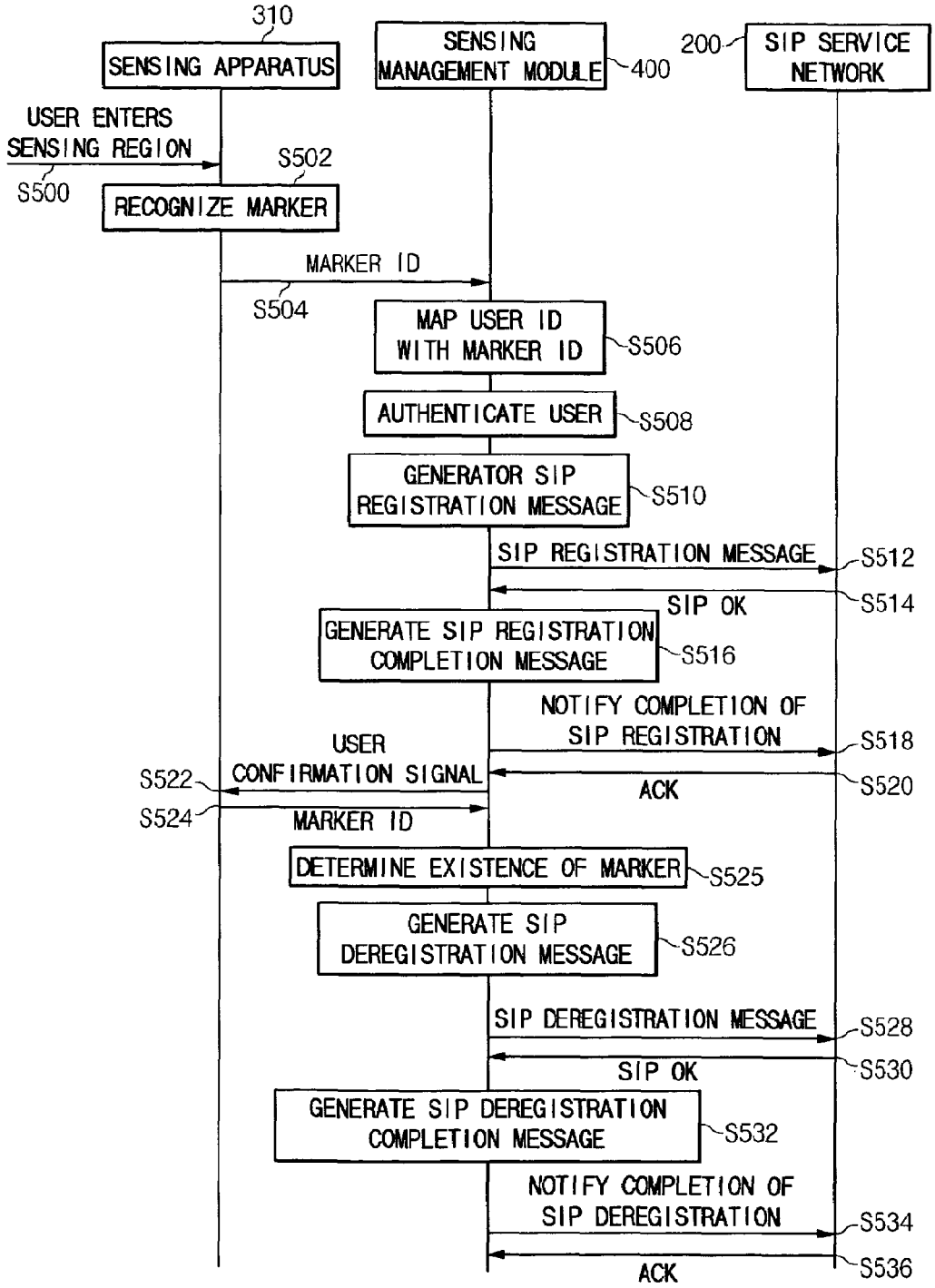
FIG. 5 is a flow chart illustrating an SIP-based user mobility providing method according to an embodiment of the present invention.

An SIP-based user mobility providing method using user position information obtained by the sensing apparatus will now be explained in detail with reference to FIG. 5. FIG. 5 is a flow chart showing the SIP-based user mobility providing method according to an embodiment of the present invention.

When a user enters the sensing region 300, the receiver 312 receives the ID of the marker 314 using a predetermined method to detect a movement of the user in step S502. For example, the receiver 312 carries out a separate procedure of confirming the existence of the marker 314 periodically to detect a movement of a person or an object carrying the marker 314 when the marker 314 is passive. When the marker 314 is active, the receiver 312 detects a movement of the person or object carrying the marker 314 through information received from the marker 314.

The receiver 312 that has detected a motion of the user transmits the ID of the marker to the sensing management module 400 through the receiver interface 412. That is, the receiver 312 recognizes whether the user enters a specific area defined as the sensing region 300 or goes out of the area in step S502, and controls information on the marker 314 and processes the received identification information of the marker to transmit it to the gateway in step 504, to support user mobility.

Then, the user/marker mapping manager 422 of the sensing management module 400 maps the marker ID with a URI of the user to determine that the user has entered the sensing region 300 in step S506. Mapping information on the marker ID and user's URI is managed by a corresponding service provider when the user subscribes to the service provider to be provided with the marker. That is, the mapping information on all users who can be provided with the service in the sensing region 300 is managed irrespective of whether the users exist in the sensing region.

When the existence of the marker is recognized through the sensing receiver interface 412, the user authentication unit 440 of the sensing management module 400 determines whether the user carrying the marker is authorized to use a terminal existing in the sensing region 300 to authenticate the user in step S508.

When it is confirmed that the user entering the sensing region 300 subscribes to an SIP service provider, the SIP user registration/cancellation proxy unit 452 of the sensing management module 400 generates an SIP registration message in place of a user agent UA of each terminal 320 existing in the sensing region 300 in step S510, and transmits the SIP registration message to the SIP proxy server 210 through the SIP proxy server interface 414 in step S512. When the SIP proxy server 210 receives the SIP registration message from the SIP user registration/cancellation proxy unit 452, the SIP proxy server 210 transmits an acknowledge signal SIP OK in response to the received result in step S514.

At the instant of time when the sensing management module 400 completes the SIP registration, the SIP user registration/cancellation notifying unit 454 of the sensing management module 400 generates SIP registration completion messages for all of the SIP terminals existing in the sensing region 300 in step S516, and notifies the user agents of the SIP terminals that the SIP user registration has been completed in step S518. When each of the SIP terminals receives the notification, it transmits an acknowledge signal to the sensing management module 400 in step S520. Then, the user agent UA of each SIP terminal becomes an available state for transmitting or receiving an INVITE message capable of carrying out the service after SIP registration is finished.

The sensing management module 400 periodically sends a confirmation signal to the receiver 312 with respect to the user existing in the sensing region 300 to confirm whether the marker IDs recognized by the receiver 312 still exist in step S522. The receiver 312 that has received the 15 confirmation signal from the sensing management module 400 transmits IDs of markers existing in the sensing region 300. When there is no ID of the marker that previously entered the sensing region 300 among the marker IDs transmitted from the receiver, a user carrying the corresponding marker is considered to have gone out of the sensing region 300. These operations are performed by the active user manager 426.

When the active user manager 426 of the sensing management module 400 determines that the corresponding user has gone out of the sensing region 300 in step S525, the SIP user registration/cancellation proxy unit 452 generates an SIP deregistration message in step S526, to cancel the SIP registration for the corresponding SIP terminal 320. Then, the SIP user registration/cancellation proxy unit 452 transmits the SIP deregistration message to the SIP proxy server 210 through the SIP proxy interface 414 in step S528. The SIP proxy server 210 receives the SIP deregistration message and transmits an acknowledge signal SIP OK to the sensing management module 400 in step S530.

At the instant of time when the sensing management module 400 completes the cancellation of SIP registration, the SIP user registration/cancellation notifying unit 454 of the sensing management module 400 generates an SIP deregistration completion message for all the SIP terminals existing in the sensing region 300 in step S532, to notify the user agents UA of the SIP terminals that the SIP deregistration has been cancelled in step S534. Each the SIP terminals that has received the notification transmits an acknowledgement signal ACK to the sensing management module 400 in step S536.

While the separate computer (gateway) 330 having software functioning as the sensing management module is connected with the sensing apparatus 310 in the aforementioned embodiment of the present invention, it is not restricted thereto. For example, the sensing apparatus 310 may not be connected to the gateway 330 and the receiver 312 of the sensing apparatus 310 may be constructed such that it has computing capability. Otherwise, the sensing management module can be inserted into a separate device having computing capability and being operated through an internal interface of the sensing apparatus 310.

The components of the sensing management module are required to manage an arbitrary sensing region. When a management region of a gateway existing for a specific purpose on a home network or an office network or agents, which are included in a physical network environment having unique characteristics, corresponds to the sensing region, the components of the sensing management module can be mounted on the same platform as the platform of the gateway or agents.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, a user can use a terminal existing in an arbitrary area to originate a call or receive a call when the user has moved to the area from an area where his/her terminal exists in an environment where various communication terminals and communication infrastructures for supporting the terminals coexist. Furthermore, even when the user is located in an area where his/her terminal does not exist, the user can be provided with a desired communication service using a terminal having the same capability and characteristics as those of his/her terminal if the terminal exists in the area.

Moreover, the present invention can support user mobility such that a user can be provided with the user mobility services using various terminals. Furthermore, according to the present invention, the user does not have to intentionally carry out SIP user registration using a terminal he/she wants to use. In addition, since an arbitrary terminal can provide a ubiquitous service for an arbitrary user in a ubiquitous service environment, the user can receive a call using the same kind of terminal as his/her own terminal among terminals existing in the area where the user is currently located.

What is claimed is:

[1. An SIP (Session Initiation protocol)-based user mobility service providing apparatus that is connected to an SIP-based IP multimedia service network in an environment where various communication infrastructures coexist and transmits an SIP message to an SIP terminal and an SIP proxy server through a gateway to provide a mobile user with an SIP service, comprising:

a sensing part that detects an event that the user enters a specific region or goes out of the specific region based on signals from at least one marker, to obtain a position of the user; and a sensing management module that receives information on the position of the user in the specific region from the sensing part and carries out SIP registration for terminals in the specific region when it is confirmed that the user, enters the specific region and carries out SIP cancellation of SIP registration for terminals in the specific region when it is confirmed that the user goes out of the specific region.]

[2. The SIP-based user mobility service providing apparatus as claimed in claim 1, wherein the specific terminal has the same capability as that of a terminal selected on the basis of a predetermined terminal priority order depending on a user's preferences among the several of terminals existing in the specific region.]

[3. The SIP-based user mobility service providing apparatus as claimed in claim 1, wherein the at least one marker transmits specific information in the signals in response to the user's position, and the sensing part includes a receiver that receives signals with the specific information from the at least one marker to detect the event that the user enters the specific region or goes out of the specific region and transmits the detected information to the sensing management unit.]

[4. The SIP-based user mobility service providing apparatus as claimed in claim 1, wherein the sensing management module is mounted in the gateway.]

[5. The SIP-based user mobility service providing apparatus as claimed in claim 1, wherein the sensing management module is constructed in a separate machine having computing capability.]

[6. The SIP-based user mobility service providing apparatus as claimed in claim 1, wherein the sensing management module comprises:

an interface unit for communicating with the receiver of the sensing unit, the SIP proxy server, the SIP terminal, and an operator terminal that manages the receiver of the sensing unit and controls the sensing management unit;

an information managing unit that manages the user information and information on the terminals in the specific region; and an SIP service supporting unit that carries out SIP registration for the each terminals existing in the specific region and notification of the completion of SIP registration such that the user is provided with the SIP service.]

[7. The SIP-based user mobility service providing apparatus as claimed in claim 6, wherein the operator terminal determines a range of the specific region on the basis of a marker detection allowable limit of the receiver.]

[8. The SIP-based user mobility service providing apparatus as claimed in claim 6, wherein the operator terminal determines a marker monitoring period to determine whether the user exists in the specific region.]

[9. The SIP-based user mobility service providing apparatus as claimed in claim 6, wherein the sensing management module further comprises a user authentication unit that determines whether the user in the specific region uses the several terminals existing in the specific region and whether the user subscribes to an SIP service provider.]

[10. The SIP-based user mobility service providing apparatus as claimed in claim 6, wherein the sensing management module further comprises a management information database for storing SIP registration related information including the user information and the information on the terminals in the specific region.]

[11. The SIP-based user mobility service providing apparatus as claimed in claim 6, wherein the information managing unit comprises:

a user/marker mapping manager for managing mapping information of an ID of the at least one marker and a URI (uniform resource identifier) of the user;

a terminal information manager for managing the information on the terminals existing in the specific region; and an active user manager for managing active information of the user in the specific region.]

[12. The SIP-based user mobility service providing apparatus as claimed in claim 6, wherein the SIP service supporting unit comprises:

an SIP user registration/cancellation proxy unit that generates an SIP registration message for each of the several terminals in the specific region according to the SIP registration related information and transmits the SIP registration message to the SIP proxy server to perform SIP registration; and an SIP user registration/cancellation notifying unit that notifies the SIP terminal of the completion of SIP user registration when SIP registration has been completed through the SIP user registration/cancellation proxy unit.]

[13. The SIP-based user mobility service providing apparatus as claimed in claim 6, wherein the interface unit comprises:

a sensing receiver interface that provides an interface for transmitting information on the result of the detection of the event that the user enters the specific region or goes out of the region from the sensing part to the sensing management module;

an SIP proxy server interface that provides an interface for transmitting the SIP registration message for each of the terminals to the SIP proxy server;

an SIP terminal interface that provides an interface for transmitting the SIP registration completion notification to the SIP terminal; and an operator interface that provides an interface for operating and controlling the sensing management module by the operator terminal.]

[14. An SIP-based user mobility service providing method using an SIP (session initiation protocol)-based user mobility providing apparatus that is connected to an SIP-based IP multimedia service network in an environment where various communication infrastructures coexist, and transmits an SIP message to an SIP terminal and an SIP proxy server through a gateway to provide a mobile user with an SIP service, comprising:

a) converting each terminals existing in a specific region to an available state when a user who is authorized to use the SIP service enters the specific region; and b) receiving a call using a specific terminal having the same capability as that of a terminal previously set on the basis of a user's preferences among the several terminals in the available state, wherein converting each terminal further comprises:

detecting an event that the user enters the specific region based on signals from at least one marker;

generating an SIP registration message for terminals in the specific region and transmitting the SIP registration message to the SIP proxy server to carry out SIP registration when it is confirmed that the user enters the specific region; and generating an SIP deregistration message for the terminals in the specific region and transmitting the SIP deregistration message to the SIP proxy server, to carry out cancellation of SIP registration when it is confirmed that the user goes out of the specific region.]

[15. The SIP-based user mobility service providing method as claimed in claim 14, further comprising performing user authentication for determining whether the user is authorized to use the terminals existing in the specific region and whether the user is authorized to use the SIP service when the user enters the specific region before the converting the each terminals existing in the specific region to the available state when the user who is authorized to use the SIP service enters the specific region.]

[16. The SIP-based user mobility service providing method as claimed in claim 15, wherein step a) further comprises periodically confirming whether the user exists in the specific region after the notifying the SIP terminal of the completion of SIP registration when SIP registration has been completed.]

*17. An SIP (Session Initiation Protocol)-based user mobility service providing apparatus that is connected to an SIP-based IP multimedia service network, comprising:*

*a receiver to receive a signal from a portable device to detect that the portable device enters a specific region or goes out of the specific region; and*

*a management unit to receive information related to the portable device based on the signal, and to carry out registration using a first SIP message for a terminal in the specific region when the portable device enters the specific region, and to carry out deregistration using a second SIP message for the terminal in the specific region when the portable device goes out of the specific region.*

*18. The SIP-based user mobility service providing apparatus as claimed in claim 17, wherein the specific region is determined on the basis of an area where the receiver recognizes the signal from the portable device.*

*19. The SIP-based user mobility service providing apparatus as claimed in claim 17, wherein the portable device has a small size and low power consumption.*

*20. The SIP-based user mobility service providing apparatus as claimed in claim 17, wherein the management unit selects the terminal for a communication session.*

*21. The SIP-based user mobility service providing apparatus as claimed in claim 17, wherein the management unit comprises:*

*an interface unit to communicate with the receiver, an SIP proxy server, the terminal, and an operator terminal that manages the receiver and controls the management unit;*

*an information managing unit to manage user information and information on the terminal in the specific region; and*

*an SIP service supporting unit to carry out the registration for the terminal in the specific region and notification of the completion of the registration.*

*22. The SIP-based user mobility service providing apparatus as claimed in claim 21, wherein the operator terminal determines a range of the specific region on the basis of an area where the receiver recognizes the signal from the portable device.*

*23. The SIP-based user mobility service providing apparatus as claimed in claim 21, wherein the management unit further comprises a user authentication unit to determine whether a user corresponding to the portable device is authorized to use the terminal in the specific region.*

*24. The SIP-based user mobility service providing apparatus as claimed in claim 21, wherein the management unit further comprises a management information database to store registration related information including the user information and the information on the terminal in the specific region.*

*25. The SIP-based user mobility service providing apparatus as claimed in claim 21, wherein the information managing unit comprises:*

*a user/portable device mapping manager to map specific information of the portable device with a URI (uniform resource identifier) of a user;*

*a terminal information manager to manage the information on the terminal in the specific region; and*

*an active user manager to manage active information of the user in the specific region.*

*26. The SIP-based user mobility service providing apparatus as claimed in claim 21, wherein the SIP service supporting unit comprises:*

*an SIP user registration/cancellation proxy unit to generate the first SIP message for the registration of the terminal in the specific region according to the registration related information and to transmit the first SIP message for the registration to the SIP proxy server to perform the registration; and*

*an SIP user registration/cancellation notifying unit to notify the terminal of the completion of the registration when the registration has been completed through the SIP user registration/cancellation proxy unit.*

*27. The SIP-based user mobility service providing apparatus as claimed in claim 21, wherein the interface unit comprises:*

*a sensing receiver interface to provide an interface for transmitting information, when the portable device enters the specific region or goes out of the region, from the receiver to the management unit;*

*an SIP proxy server interface to provide an interface for transmitting the first SIP message for the registration of the terminal to the SIP proxy server;*

*an SIP terminal interface to provide an interface for transmitting the registration completion notification to the terminal; and*

*an operator interface to provide an interface for operating and controlling the management unit by the operator terminal.*

*28. An SIP-based user mobility service providing method using an SIP (session initiation protocol)-based user mobility providing apparatus that is connected to an SIP-based IP multimedia service network, comprising:*

*receiving a signal from a portable device at a receiver to detect that the portable device enters a specific region or goes out of the specific region;*

*receiving information related to the portable device based on the signal from the receiver at a management unit; and*

*performing, by the management unit, registration using a first SIP message for a terminal in the specific region when the portable device enters the specific region;*

*wherein the management unit performs deregistration using a second SIP message for the terminal in the specific region when the portable device goes out of the specific region.*

*29. The SIP-based user mobility service providing method as claimed in claim 28, wherein the specific region is deter-*

*mined on the basis of an area where the receiver recognizes the signal from the portable device.*

*30. The SIP-based user mobility service providing method as claimed in claim 28, wherein the portable device has a small size and low power consumption.*

*31. The SIP-based user mobility service providing method as claimed in claim 28, wherein the management unit selects the terminal for a communication session.*

*32. The SIP-based user mobility service providing method as claimed in claim 28, wherein the management unit determines whether a user corresponding to the portable device is authorized to use the terminal in the specific region.*

*33. An SIP-based user mobility service providing method using an SIP (session initiation protocol)-based user mobility providing apparatus that is connected to an SIP-based IP multimedia service network, comprising:*

*converting a terminal in a specific region to an available state or an unavailable state on the basis of a detection that a portable device enters the specific region or exits the specific region; and*

*receiving a call using the terminal for a communication session,*

*wherein converting the terminal to the available state further comprises:*

*detecting that the portable device enters the specific region based on a signal from the portable device;*

*generating a first SIP message for registration of the terminal in the specific region and transmitting the first SIP message to an SIP proxy server to carry out the registration if the portable device enters the specific region;*

*wherein converting the terminal to the unavailable state further comprises:*

*detecting that the portable device exits the specific region based on a signal from the portable device;*

*generating a second SIP message for deregistration of the terminal in the specific region and transmitting the second SIP message for deregistration to the SIP proxy server to carry out deregistration if the portable device exits the specific region.*

*34. The SIP-based user mobility service providing method as claimed in claim 33, wherein the specific region is determined on the basis of an area where the receiver recognizes the signal from the portable device.*

*35. The SIP-based user mobility service providing method as claimed in claim 33, wherein the portable device has a small size and low power consumption.*

*36. The SIP-based user mobility service providing method as claimed in claim 33, further comprising:*

*performing user authentication for determining whether a user corresponding to the portable device is authorized to use the terminal in the specific region when the user enters the specific region before the converting the terminal in the specific region to the available state.*

* * * * *